INVENTOR
DONALD G. RADKE
FREDERICK C. BOOTH

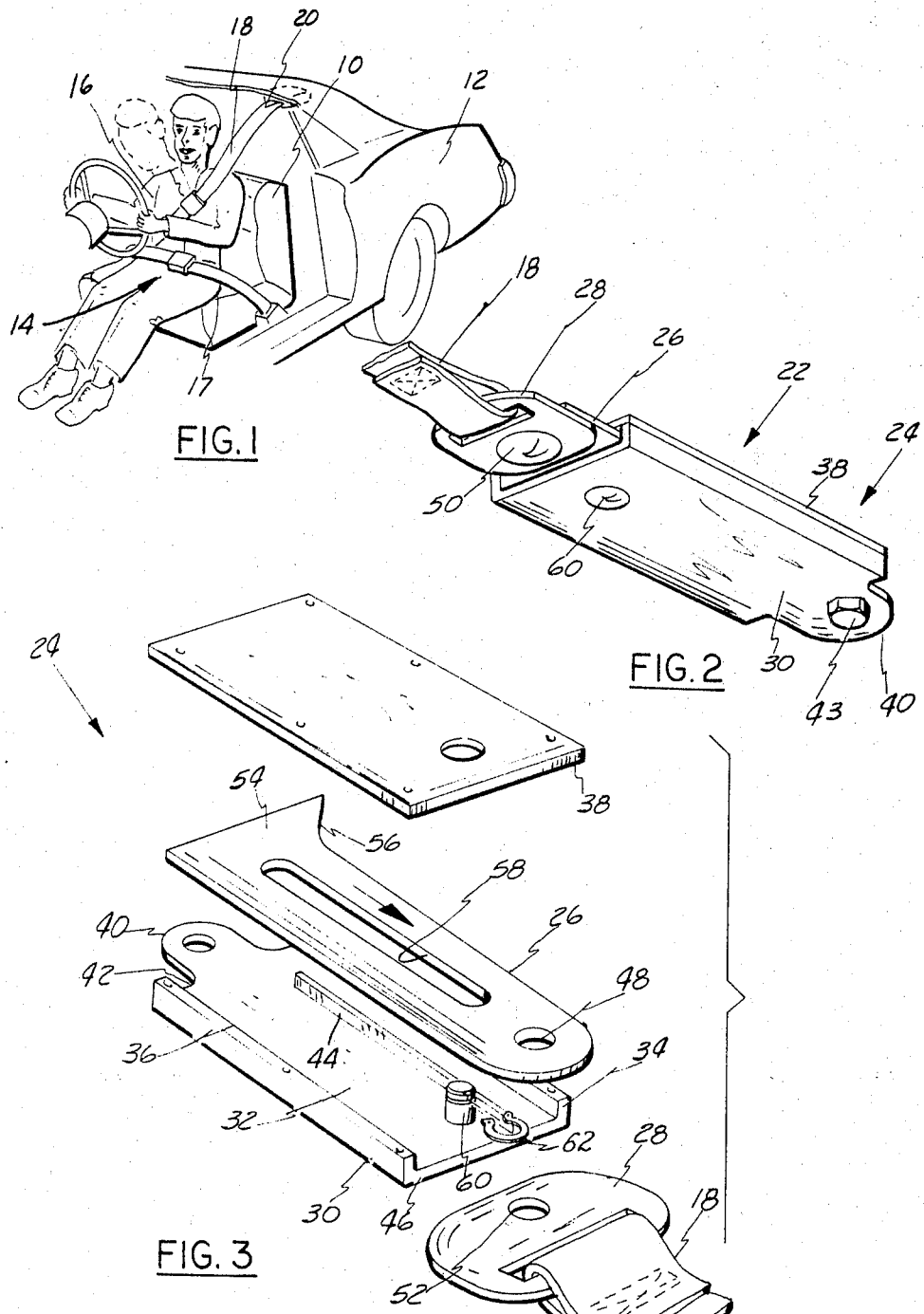

BY

ATTORNEYS

United States Patent Office 3,438,674
Patented Apr. 15, 1969

3,438,674
SAFETY SEAT BELT DEVICE WITH SHEAR STRIP
ENERGY ABSORBING MEANS
Donald G. Radke, Troy, and Frederick C. Booth, Birmingham, Mich., assignors to Jim Robbins Seat Belt Co., Royal Oak, Mich.
Filed July 13, 1967, Ser. No. 653,248
Int. Cl. B60r 21/10; A47d 1/12; A47c 31/00; B6n 7/00
U.S. Cl. 297—386                                    15 Claims

ABSTRACT OF THE DISCLOSURE

An energy absorbing connection between a vehicle safety seat belt and the vehicle for restraining the sudden displacement of an occupant from his seated position. The connection includes an elongated shear strip fixedly mounted to the vehicle and a shear member connected by the seat belt to the occupant with a cutting edge engaged with the strip and movable along a shearing path. When the occupant is suddenly displaced by abnormal forces acting on the vehicle the shearing action absorbs the kinetic energy of the occupant.

BACKGROUND OF THE INVENTION

Field of the invention

This invention relates to energy absorbing devices for vehicle safety seat belt systems and more particularly to such a device wherein the sudden displacement of an occupant of a vehicle is opposed by a pair of relatively movable members moving in shearing relationship to one another.

Description of the prior art

A typical vehicle safety belt system is designed to restrict the displacement of an occupant of the vehicle away from a seated position when the vehicle experiences a sudden and sharp deceleration or other abrupt change in momentum. The object of such seat belt systems is to prevent the occupant from continuing in the direction of the former travel of the vehicle until he is stopped by relatively unyielding surfaces of the passenger compartment.

Crash studies have indicated that a secondary problem results when the occupant has both lap and shoulder belt restraints. After the vehicle's initial impact, the occupant tends to move in a forward direction until the slack in the belts has been taken up sufficiently to build up restraining forces. The relatively unyielding belts then cause the occupant to snap back toward his original position where he often experiences neck and back injuries when he impacts the back structure of the seat assembly. In addition, this rebound effect often snaps the occupant of a forward seat in the car rearwardly along the path of the forward movement of a non-restrained occupant of a rear seat until the two occupants come into injury producing contact.

The broad purpose of the present invention is to provide means for connecting a seat belt to the vehicle by a mounting constructed to absorb the kinetic energy of the occupant as he is displaced forwardly from his seated position and which eliminates the rebound effect associated with conventional seat belt assemblies.

SUMMARY

The preferred embodiment of the present invention, which will be subsequently described in greater detail, is described with reference to a device which connects the shoulder harness of a vehicle seat belt system to a relatively fixed structural member of the vehicle. It is to be understood, however, that the preferred embodiment can be employed as a connection between the lap section of a seat belt system and the vehicle or as a link intermediate the ends of a section of webbing so long as the preferred device is arranged to transmit restraining forces between the occupant and the vehicle when abnormal forces acting on the vehicle tend to suddenly and violently shift the occupant from his normal seated position.

The preferred emobidment comprises an elongated, extruded rectangular plate section having a pair of integral side walls extending upwardly from a flat base. A cover member attached to the upper edges of the side walls cooperates with the extruded section to form an elongated open ended guideway. One end of the extruded section is adapted for a fixed attachment to the vehicle.

An integral, elongated shear strip extends normally from the flat base and parallel to the side walls. The shear strip has a predetermined thickness which is preferably uniform throughout its length.

A flat elongated shear or cutter member attached to the seat belt and having a width generally corresponding to the distance between the shear strip and the opposite side wall carries a laterally extending cutting edge which normally abuts the end of the shear strip.

When a sudden force of a predetermined magnitude caused by a build up of restraining forces on the occupant acts on the shear member, the shear member commences to move longitudinally along the guideway with its shearing edge shearing the full thickness of the shear strip.

Preferably the shear member can move up to six inches thereby permitting the occupant to be gradually decelerated in a cushioned manner as his kinetic energy is absorbed by the shearing action. Normally, the preferred energy absorbing device provides a non-yielding tensile connection between the seat belt and the vehicle, with the thickness of the shear strip and the material of the shear member and the shear strip arranged to commence the shearing action when the restraining forces applied by the belt have built up to 700 pounds. In addition to providing a cushioned deceleration, the preferred device eliminates the rebound effect of the conventional non-yielding seat belt systems.

Another embodiment of the invention employs an extruded section having a pair of spaced parallel shear strips with two shear members arranged in the giudeway between the shear strips each of the shear members having a pair of laterally directed shearing edges. One shear member is attached to the seat belt and the other shear member is attached to the vehicle. The two shear members are movable in opposite directions with one of the shear members being movable in a shear stroke of three inches and the second shear member being movable in the opposite direction in a shear stroke of three inches so that the two shear members provide an overall belt movement of six inches.

It is therefore an object of the present invention to provide a shock absorbing device for coupling a vehicle safety seat belt to the vehicle which normally provides a non-yielding connection for the transfer of restraining forces applied by the seat belt on the occupant but which produces relative movement between a shear strip and a shear member upon the application of a predetermined restraining force to produce a shearing action for absorbing the kinetic energy of the occupant.

Another object of the present invention is to improve restraining means for controlling the movement of an occupant of a vehicle relative to the vehicle when abnormal forces produce a sudden change in the vehicle's momentum by providing an elongated shear strip fixedly connected to the vehicle, a shear member having a shearing edge and mounted for guided movement along the shear strip so that the shearing edge engages the shear strip when the kinetic energy of the occupant causes the shear member to move along the shear strip.

A still further object of the present invention is to provide a shock absorbing device for coupling a vehicle safety seat belt to the vehicle including a flat extruded section fixedly connected to the vehicle and having an integral shear strip formed normally to the surface of the flat section, and a shear member connected to the seat belt and guided for movement along the shear strip so that a shearing edge carried by the shear member moves in cutting engagement with the shear strip when a restraining force of a predetermined magnitude is applied by the belt on the occupant, and including stop means for terminating the travel of the shear member a predetermined distance from its initial position.

Still another object of the present invention is to provide a device for absorbing the kinetic energy of an occupant of a vehicle experiencing a sudden deceleration in its forward momentum and which eliminates the rebound effect of conventional safety seat belt restraining means by providing a device which employs the work of shearing an elongated strip of metal fixedly connected to the vehicle for absorbing the kinetic energy of the occupant.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIGURE 1 is a perspective view of a vehicle safety seat belt system employing an energy absorbing apparatus illustrating the preferred embodiment of the invention.

FIGURE 2 is a perspective view of the energy absorbing apparatus employed in the system of FIGURE 1 which couples the shoulder harness webbing to the vehicle;

FIGURE 3 is an exploded view of the preferred energy absorbing device;

DESCRIPTION OF THE PREFERRED EMBODIMENTS

Figure 4:
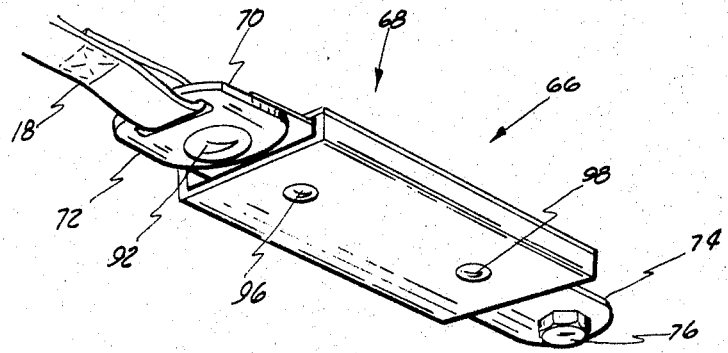
FIGURE 4 is a perspective view of another embodiment of the invention which employs two shear members.

Now referring to the drawings, FIGURE 1 illustrates a seat assembly 10 mounted to the floor of a vehicle 12 and a safety seat belt system 14 for controlling the movement of an occupant 16 seated on the seat assembly 10. The seat belt system 14 includes a lap section 17 having opposite ends anchored to the floor of the vehicle 12 and a shoulder harness section 18 which has its lower end coupled to the lap section 16 and its upper end connected to the vehicle 12 behind and above the seat assembly 10. For purposes of description the preferred energy absorbing device is described as a means for coupling the upper end of the shoulder harness belt 18 to the vehicle 12 and is housed by an enclosure 20. It is to be understood, however, that the preferred energy absorbing device can be employed as a means for coupling the terminal ends of the lap belt sections 17 to the vehicle or as an intermediate link between a pair of belt halves.

Referring to FIGURES 2 and 3, the preferred energy absorbing device 22 comprises a housing assembly 24 adapted for a fixed connection to the vehicle 12 and engaged with a shear member 26 connected to the upper end of the shoulder belt 18 through a coupling member 28.

The housing 24 preferably comprises an extrusion 30 of aluminum or other suitable material having a flat plate like base 32 and a pair of integral side walls 34 and 36 extending normally from the base 32. The side walls 34 and 36 are parallel to one another and support a generally rectangular cover member 38 above the base 32. The extruded section 30 and the cover member 38 define an elongated guideway having a generally rectangular cross-section for the shear member 26. The extruded section 30 has an apertured extension 40 adjacent an open end 42 adapted to be connected to the vehicle 12 by a threaded fastener 43.

An integral, elongated, shear strip 44 extends upwardly from the base 32 and from adjacent the open end 42 toward the opposite open end 46. The shear strip 44 is parallel to the side wall 34 and preferably has a predetermined thickness throughout its length.

The shear member 26 is preferably formed of an elongated substantially plate like section of steel having a width generally corresponding to the distance between the inner surface of the side wall 36 and the shear strip 44. The end of the shear member 26 connected to the belt 18 has an aperture 48 for receiving a rivet 50 which connects the shear member 26 to the coupling member 28 which has a rivet-receiving aperture 52. The opposite end of the shear member 26 has a lateral extending portion 54 with a shearing or cutting edge 56 which extends generally diagonally with respect to the relative movement between the shear member 26 and the shear strip 44. Preferably the width of the lateral section 54 is slightly less than the distance between the side walls 34 and 36. When the shear member 26 is disposed on the base 32, the shearing edge 56 abuts the end of the shear strip 44 and provides a force transmitting connection between the base 32 and the shear member 26. Restraining forces acting on the belt 18 tend to pull the shear member 26 longitudinally through the housing 24. The thickness and the material of the shear strip 44 is chosen such that when the restraining forces acting between the belt 18 and the vehicle 12 increase to a magnitude of about 700 pounds, the shear member 26 commences to move longitudinally through the housing 24 with the shearing edge 56 shearing the shear strip 44 at its base. The shear strip 44 preferably has a uniform thickness throughout its length so that the shearing action is constant throughout the entire travel of the shear member 26.

The shear member 26 has an elongated slot 58 engaged with a pin 60 which is carried by the base 32 and extends upwardly therefrom and through the cover 38.

A snap ring 62 retains the pin 60 against separation from the housing 24. The pin 60 functions as a stop member for the shear member 26 after the shear member 26 has moved a predetermined distance from its initial position by coming into abutment with the end of the slot 58. Upon termination of the travel of the shear member 26 by the pin 60, the belt forces are transmitted through the shear member 26, the pin 60 and the base 32 to the vehicle 12.

Thus it can be seen that the preferred embodiment of the invention provides a shearing action for absorbing the kinetic energy of the occupant 16 being suddenly shifted forward from an initial position such as is illustrated in solid lines in FIGURE 1 to a forward position which is illustrated in phantom. As the occupant 16 moves forwardly upon the sudden deceleration of the vehicle 12, he experiences a gradual deceleration and comes to substantially a dead stop at the end of his forward travel without any of the rebound effect of conventional seat belt assemblies.

Figure 5:
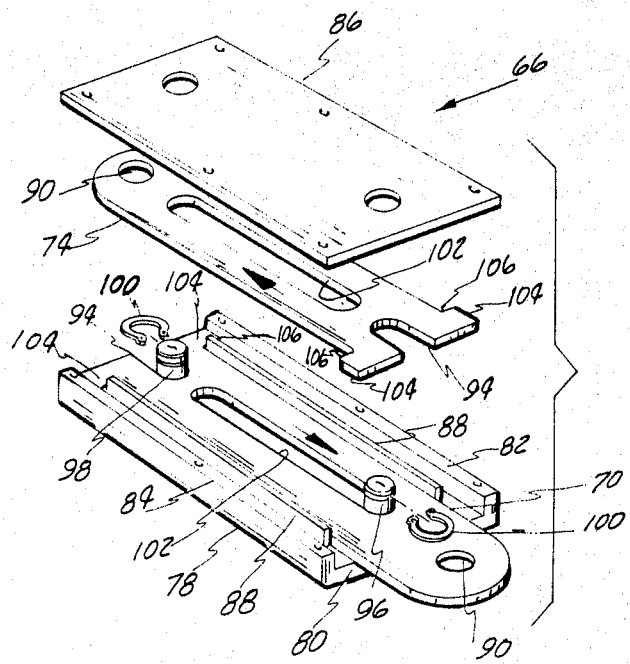
FIGURE 5 is an exploded view of the energy absorbing device of FIGURE 4.

Now referring to FIGURES 4 and 5, an energy absorbing device 66 illustrating another embodiment of the invention comprises a housing 68, a first shear member 70 adapted for connection to the belt 18 through a coupling 72 and a second shear member 74 adapted for attachment to the vehicle 12 through a threaded member 76 or the like. The energy absorbing device 66 is similar to the energy absorbing device 22 with the exception that the device 66 employs a pair of shear members which move in opposite directions relative to one another and each of which has a pair of laterally extending shearing edges.

The housing 68 preferably comprises an extrusion 78 of a relatively soft metal such as aluminum having a flat base 80 and a pair of side walls 82 and 84 extending normally along opposite side edges of the base 80. A rectangular cover member 86 is mounted on the upper edges of the side walls 82 and 84 and cooperates with the extrusion 78 to form an elongated guideway for the shear members 70 and 74.

A pair of integral, elongated shear strips 88 arranged in spaced parallel relationship to one another and to the side walls 82 and 84 extend perpendicularly from the base 80 of the ertrusion. The opposite ends of the shear strips 88 are slightly spaced from the open ends of the housing 68 and have a predetermined thickness to develop a predetermined shearing force opposing the longitudinal movement of the shear members 70 and 74 through the housing 68. The shear strips 88 preferably have a uniform thickness throughout their entire lengths so that they cooperate with the shear members to provide a constant deceleration of the occupant 16.

The shear members 70 and 74 are similar to one another, each including an aperture 90 adjacent one end thereof. The aperture 90 of the lower shear member 70 accommodates a rivet 92 which fastens the shear member 70 to the coupling 72. The aperture 90 of the upper shear member 74 receives the threaded fastener 76 to provide a fixed connection to the vehicle 12. The opposite end of each of the shear members 70 and 74 has an open ended axial slot 94 accommodating a pair of pins 96 and 98 which extend through the housing 68 and function as stop means for the shear members 70 and 74 to terminate their longitudinal movement. Retainer 100 provides means for releasably retaining the pins 96 and 98 to the housing 68.

Elongated longitudinally extending slots 102 in the midportion of each of the shear members 70 and 74 are associated with the pins 96 and 98. The slots 102 cooperate with the pins 96 ond 98 to terminate the travel of the shear members 70 and 74 at the end of their shearing stroke.

Each shear member has a pair of oppositely directed, lateral extensions 104. The end of each of the shear members associated with extensions 104 has a width corresponding to the distance between the side walls 82 and 84 and the body of each of the shear members has a width generally corresponding to the distance between he shear strips 88. Thus, the shear strips 88 guide the shear members as they are pulled through the housing 68. A shearing edge 106 which forms the forward edge of the lateral extensions 104 is normally in abutment with the end of the shear strips 88.

The shear members 70 and 74 preferably have a combined thickness slightly less than the height of the shear strips 88 so that when the shear members are disposed within the housing, they share the two shear strips. Normally, the energy absorbing device transmits restraining forces from the belt 18 to the vehicle 12 through the shear member 70, the shear strips 88 and the shear member 74, with the shearing edges 106 of both the shear members in abutment with the ends of the shear strips 88. When a predetermined restraining force of 700 pounds has been built up by the occupant suddenly shifting forwardly from his seated position by violent impact forces on the vehicle, the shear member 74, which is the furthermost shear member from the base 80 commences to shear the upper half of each of the shear strips 88 and travels longitudinally through the housing 68 until its movement is terminated by the pin 98 coming into abutment with the end of the slot 102 of the shear member 74. The lower shear member 70 then commences its shearing engagement with the shear strips 88 to provide additional movement of the belt 18 relative to the vehicle until the pin 96 comes into abutment with the end of the slot 102 of the shear member 70 to terminate the travel of the shear member 70.

Preferably each of the shear members 70 and 74 have a total relative movement with respect to the shear strips 88 of three inches so that the occupant is allowed a total forward displacement of six inches. As the occupant is displaced forwardly, his kinetic energy is absorbed in the work of shearing the shear strips 88 so that at the end of his forward travel he comes to a dead stop without any rebound back toward his initial position.

Although we have described but two preferred embodiments of our invention, it is to be understood that various changes and revisions can be made therein without departing from the spirit of the invention.

We claim:

1. In a vehicle, means for restraining a motion of an occupant of the vehicle with respect to the vehicle, including:
   (a) a plate fixedly connected with respect to the vehicle;
   (b) a first elongated strip of shearable material integrally joined along its length to said plate so as to extend normally with respect to the surface of said plate;
   (c) a second elongated strip integrally joined along its length to the same surface of the plate so as to extend normally from the same surface of the plate as the first strip and parallel to said first strip;
   (d) a cutter member disposed between said first and second strips and supported for a motion with respect to the plate along a path parallel to the surface of the plate and to said strips from a first position toward a second position, said cutter member having a shearing edge that extends laterally with respect to the direction of motion of the cutter member as it is moved along said path and beyond the first strip; and
   (e) means for connecting said cutter member to an occupant of the vehicle such that the cutting edge of the cutter member is moved from its first position along said path in response to a predetermined displacement of the occupant such that its cutting edge shears the first elongated strip as it is moved from its first position toward its second position.

2. In a vehicle, the combination comprising:
   (a) housing means including a housing member;
   (b) a cutter member supported in said housing means for motion with respect to the housing means from a first position toward a second position along a predetermined path of motion, said cutter member having a cutting edge that is generally transverse with respect to the direction of motion of the cutter member as it is moved along said path;
   (c) an elongated strip of shearable material in said housing means, fixed along its length to said housing member in the path of motion of the cutting member such that said cutting edge shears the elongated strip as the cutter member is moved from its first position along said path; and
   (d) means for connecting one of said members to the vehicle such that a predetermined motion of the other member with respect to the vehicle moves the cutter member along its path of motion.

3. The combination as defined in claim 2, in which the housing means is elongated with a longitudinal sidewall, the path of motion of the cutting member is parallel to said sidewall, the strip extends parallel to the sidewall between the cutter member and the sidewall, and the cutting edge of the cutter member extends transversely of the elongated element to a point adjacent the sidewall so that the strip is contained between the cutter member and the sidewall as it is sheared by the cutter member.

4. The combination as defined in claim 2, in which the housing means is elongated and has a substantially uniform internal cross section along its length; the path of motion of the cutter member from its first position to its second position is parallel to the longitudinal axis of the housing means; the cutter member has a cross section, in a plane transverse to the longitudinal axis of the housing means that is complementary to the internal cross section of the housing means; and the cutting edge of the cutter member is adjacent one end of the strip when the cutter member is in its first position.

5. The combination as defined in claim 2, in which the housing means is elongated and has a pair of spaced, planar walls fixed with respect to one another; the elongated strip is integrally joined to one of said walls and extends therefrom toward the opposite wall; the cutter member is formed of a section of plate having a thickness generally corresponding to the distance between said walls with its cutting edge formed to shear the elongated strip in a plane parallel to the surface of the wall to which it is joined as the cutter member is moved from its first position toward its second position.

6. The combination as defined in claim 5, in which the cutter member has an elongated slot and is supported with the slot parallel to the longitudinal axis of the housing member; and including a pin extending between said walls and through said slot, said pin being fixed with respect to the housing member against motion in directions parallel to the walls and supported to form an abutment with the end of the slot in the cutter member to limit the travel of the cutter member as it is moved along said path from its first position toward its second position.

7. The combination as defined in claim 2, in which the housing means is elongated and has a pair of spaced, opposed planar walls fixed with respect to one another; the elongated strip is integrally joined to one of said walls and extends toward the opposite wall; and including a second elongated strip of shearable material integrally joined along its length to one of said walls such that it extends toward the opposite wall in spaced parallel relationship to the first mentioned elongated strip, and the cutter member is formed of a section of plate having a thickness generally corresponding to the distance between said walls and has cutting edges engageable with each of said elonagted strips such that as the cutter member is moved from its first position toward its second position, its cutting edges shears both of said elongated strips.

8. The combination as defined in claim 2, in which the housing means is elongated and has a pair of spaced, opposed, planar walls, fixed with respect to one another; the elongated strip is integrally joined along its length to one of said walls and extends therefrom toward the opposite wall; the cutter member is formed of a section of plate with a cutting edge engageable with the elongated strip as the cutter member is moved from its first position toward its second position; and including a second cutter member formed of a section of plate and supported in face-to-face relationship to the first mentioned cutter member with the total thickness of the two cutter members generally corresponding to the distance between said walls, the second cutter member being movable along a path that is parallel to the walls between first and second positions with respect to the housing means, and having a cutting edge disposed between the walls to engage and shear the elongated strip as the second cutter member is moved from its first position toward its second position.

9. The combination as defined in claim 8, in which the cutting edges of the two cutter members are disposed between the walls to shear the elongated strip in a pair of spaced planes that are parallel to the walls as their respective cutting members are moved with respect to the housing means.

10. The combination as defined in claim 8, in which the cutting edges of the two cutter members are supported in the housing means adjacent opposite ends of the elongated strip when each of said cutter members is in its first position, and the two cutter members are movable along their respective paths of motion in opposite directions with respect to one another such that their cutting edges approach one another as they shear the strip.

11. The invention as defined in claim 1, wherein said first elongated strip has a uniform thickness in the direction of movement of said cutter member from its first position to its second position with respect to the plate so that the occupant of said vehicle experiences a substantially constant restraining force as he is displaced within said vehicle.

12. The invention as defined in claim 1, including stop means for limiting the travel of said cutter member relative to said plate.

13. The invention as defined in claim 1, wherein said second elongated strip is formed of shearable material and including said cutter member having a second lateral extension with a shearing edge arranged to shear the second elongated strip as the cutter member is moved from its first position toward its second position with respect to the plate.

14. The invention as defined in claim 13, including an abutment carried by said cutter member and stop means fixedly mounted on said plate, said abutment being engageable with said stop means to terminate the travel of said cutter member relative to said plate and to define the second position of the cutter member with respect to the plate.

15. The invention as defined in claim 13, wherein said cutter member has an elongated slot extending in the direction of travel of said cutter member relative to said shear strip and including a stop member fixedly mounted on said plate and disposed in said slot, the end of said slot being engageable with said stop member to terminate the movement of said shear member relative to said plate and to define its second position with respect to the plate.

References Cited

UNITED STATES PATENTS 3,232,383   1/1966   Moberg.
3,280,942   10/1966  Millington.
3,308,908   3/1967   Bunn.

JAMES T. McCALL, *Primary Examiner.*

U.S. Cl. X.R.

188—1; 280—150; 297—385